United States Patent [19]

Kessler

[11] Patent Number: 4,622,137

[45] Date of Patent: Nov. 11, 1986

[54] FILTERING SYSTEM FOR SWIMMING POOLS, WITH REMOVABLE MANIFOLD ASSEMBLY AND BRAIDED FILTER GRID UNITS

[76] Inventor: Emerich Kessler, 28 Lakeview Dr., West Orange, N.J. 07052

[21] Appl. No.: 797,456

[22] Filed: Nov. 13, 1985

[51] Int. Cl.$^4$ ............................................. B01D 29/24
[52] U.S. Cl. .................................... 210/169; 210/232; 210/323.2; 210/489; 210/500.1; 55/341 R; 55/505
[58] Field of Search ............ 210/169, 232, 238, 323.2, 210/345, 437, 489, 500.1, 416.2, 425, 497.1; 55/341 R, 505

[56] References Cited

U.S. PATENT DOCUMENTS

| | | | |
|---|---|---|---|
| 585,497 | 6/1897 | Aufrichtig | 210/323.2 |
| 2,301,430 | 11/1942 | Malanowski | 210/323.2 |
| 3,100,190 | 8/1963 | Hobson, Jr. | 210/409 |
| 3,642,141 | 2/1972 | Hobson, Jr. | 210/497.01 |
| 3,859,214 | 1/1975 | Lang et al. | 210/169 |
| 3,907,686 | 9/1975 | Fletcher et al. | 210/259 |
| 3,954,621 | 5/1976 | Etani et al. | 210/169 |
| 3,969,248 | 7/1976 | Whitmer | 210/169 |
| 3,984,327 | 10/1976 | May | 210/284 |
| 3,986,958 | 10/1976 | Cattano | 210/169 |
| 4,043,917 | 8/1977 | Rowley et al. | 210/323 |
| 4,134,836 | 1/1979 | Rowley et al. | 210/232 |
| 4,263,139 | 4/1981 | Erlich | 210/169 |
| 4,330,401 | 5/1982 | Boze et al. | 210/106 |
| 4,427,551 | 1/1984 | Duveau | 210/741 |
| 4,472,281 | 9/1984 | Kerridge | 210/668 |

Primary Examiner—Richard V. Fisher
Assistant Examiner—Linda S. Evans
Attorney, Agent, or Firm—Morgan & Finnegan

[57] ABSTRACT

A filtering system, especially for swimming pools, by which a liquid or gas may be cleansed of suspended particles by passing the liquid or gas, under a pressure differential, through a multiplicity of vertical, tubular filter grids, each of which holds an outer layer of a diatomaceous earth particles which transmits the fluid and captures the particles. Each time a filtering cycle is stopped, the diatomaceous earth particles fall from the grid units due to gravity and their interconnection in the coating layer. This prolongs the useful filtration time of the filter grid units before they need to be backwashed. The filter grid units are supported by a central manifold provided with a plurality of removable hollow arms which radially extend from a central hub, and have a plurality of threaded openings therein, spaced apart from one another along the length of the arms, for receiving respective mating threaded ends of the filter grid units and aligning them in a vertical array within the filter tank. Each of the grid units is comprised of a rigid, braided or woven sock-like pervious filter tube tightly fitted over a rigid, perforated tubular frame. This arrangement prevents the adjacent grid units from tangling and losing effectiveness and also permits quick, easy removal and/or replacement of individual filter grid units.

8 Claims, 4 Drawing Figures

FILTERING SYSTEM FOR SWIMMING POOLS, WITH REMOVABLE MANIFOLD ASSEMBLY AND BRAIDED FILTER GRID UNITS

BACKGROUND OF THE INVENTION

1. Field of the Invention

This invention relates to a filtering system by which fluids may be clarified by separating constituents suspended in the fluids from a filtrate. More particularly, this invention relates to a filtering system by which a liquid or gas may be cleansed of suspended particles by passing the liquid or gas, under a pressure differential, through a multiplicity of vertical filter grids, each of which comprises a diatomaceous earth filter medium which transmits the fluid and captures the particles.

2. Description of Prior Art

Filtering systems for filtering fluids, such as water for use in a swimming pool or the like, are well-known and include those types in which multiple filter elements are provided. A pressure differential in the fluid being filtered is maintained at opposite sides of each filtering element. The filter elements may be in the form of porous or finely perforated, vertically aligned, curved rectangular plates or cylindrical tubes. In the operation of such filter elements, fluid containing a fine powder in suspension, generally a diatomaceous earth (DAE), is forced through the porous filter plates or tubes and the powder accumulates on the surface of the plates or tubes so as to reduce the size of the interstices or perforations on the plate or tube wall and thus enhance the filtering operation and ensure the removal from the fluid of particles suspended therein. It is necessary periodically to remove accumulated powders from the filter plates or tubes to prevent clogging thereof.

The plates comprise one or more hollow, rectangular inner support elements, which are perforated in a grid-like pattern. The elements are radially equidistantly disposed about an axis parallel to the longitudinal axis of the rectangular plate, and have one or more longitudinal support ribs. The inner support element is encased within an outer, fine mesh polyester cloth which passes water but retains the DAE particles. In operation, when the filtering cycle is stopped, the accumulated DAE layer falls off the outer surface of the plates. However, it has been found that accumulated DAE particles tend not to fall off at the corners and sides of such outer surfaces.

The tubes may comprise one or more layers of fine mesh wire screen mounted on rigid supports such as wire frames and often the DAE powder or the like accumulates and builds up in the spaces between the tubes. The removal of the accumulated layer of powder or "sludge", is usually effected by a so called backwash operation wherein liquid is forced through the tubes in the direction opposite to that in which the liquid flowed during the filtering operation. It has been extremely difficult and sometimes impossible, to completely remove the accumulated layer of powder from the tubes, and too often the sludge builds up or "bridges" in the spaces between the tubes which seriously interferes with the removal of sludge from the filter. Sometimes, means has been provided for mechanically removing the sludge from the filter by vigorously shaking or tapping the tubes, but this operation not only fails to accomplish a satisfactory removal of the layer of diatomaceous earth, but also may result in damage to the tubes, for example, cracking or puncturing thereof.

U.S. Pat. Nos. 3,100,190 and 3,642,141, both to Hobson, Jr. describe tube sheet assemblies wherein a plurality of flexible tubes are placed within corresponding openings in a cover plate and their top ends affixed to the cover plate. The tubes are vertically aligned and densely packed in this arrangement. Each tube has a sock-like outer side wall which is woven to permit liquid to pass through openings therein and which is flexible. Each tube also has an inner porous frame which is of smaller diameter than the diameter of the side wall and also may be inherently resilient along its longitudinal axis to permit the outer tube to be bent during a filtering operation. Because of this construction, the tubes will change in length and in diameter in response to changes in the pressure of the backwash liquid and thereby allegedly will loosen an accumulated outer layer of DAE or similar "filter aid" from the wall of the tube and cause the dislodged layer to fall away from the tube by gravity. Removal of the accumulated layer of "filter aid" or DAE from the tubes is further facilitated by so-called "bumping" of the tubes, i.e., causing rapid up and down movement of the tubes which in turn causes the tubes to sway and shake until dislodged material falls off.

In practice, however, it has been found that the flexible nature of such tubes causes them to tangle and interlock with one another such that: (1) the "bumping" does not dislodge accumulated layers of "filter aid"; (2) they cannot be easily removed from the tube sheet which holds them and thus cannot be easily and separately cleaned and/or repaired; and (3) they lose about 30% of their available surface area for filtration, thereby reducing efficiency of the filtration. Moreover, the loose fitting slidable relationship between the outer side wall and the inner support frame permits opening of the woven side wall and allows DAE particles to be passed through the tubes back to the pool during the initation of a filter cycle. Also, movement of the flexible tubes during filtering interferes with the desired accumulation of a uniform DAE layer on the tube side wall.

An object of the present invention is to provide a filtering system in which a multiplicity of individual filter units are in fluid communication with a central manifold located in the bottom portion of a filter tank which in turn is in fluid communication with an outlet conduit in the tank.

A further object of the present invention is to provide a filtering system which is comprised of a plurality of filter grid units which are supported in a filter tank by a central manifold provided with a plurality of removable hollow arms which radially extend from a central hub, and have a plurality of threaded openings therein, spaced apart from one another along the length of the arms, for receiving respective mating threaded ends of the filter grid units and vertically aligning them in the filter tank.

Another object of this invention is to provide a filtering system comprised of a multiplicity of vertical, tubular filter grid units, each of the grid units comprised of a rigid, sock-like pervious filter tube tightly fitted over a rigid, perforated tubular frame, the external surfaces of the grid units capable of being coated with a layer of DAE upon application of pressure, the DAE coating becoming easily dislodged upon removal of the pressure.

An object of this invention is to provide a tubular filter grid comprised of an outer filter tube having its walls formed of a plurality of groups of strands of small diameter, interlaced or braided so that the strands of one group are disposed in angular or criss-cross relation to the strands of other groups and thus provide minute interstices between the crossed strands through which the liquid being filtered and the backwash liquid may flow but which will prevent the passage therethrough of DAE particles.

Other objects and advantages of the invention will be apparent from the accompanying drawings and description, the essential features of which are set forth herein in the appended claims.

BRIEF DESCRIPTION OF THE DRAWINGS

In the accompanying drawings.

DETAILED DESCRIPTION OF INVENTION

Figure 1:
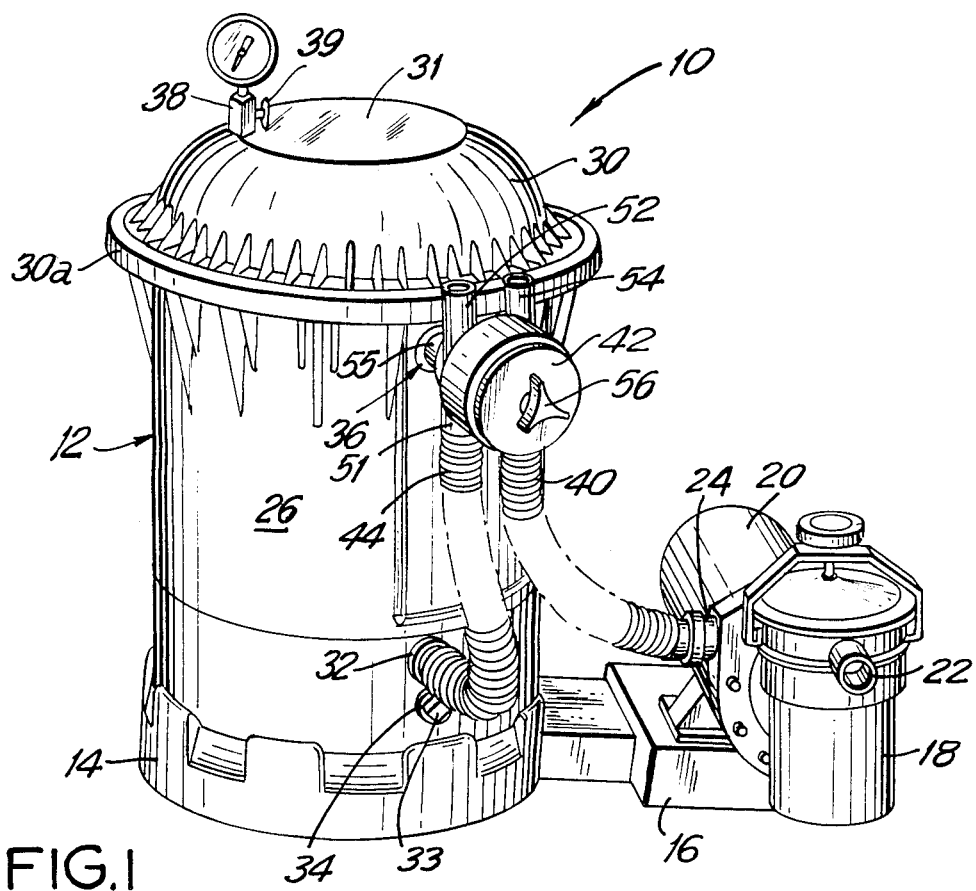
FIG. 1 is a view in elevation and perspective of a filter system in accordance with the invention showing the exterior tank and pump, motor, valve and conduit lines associated therewith.

For purposes of illustration, the filtering system of the present invention will be described in connection with a swimming pool system in which the filtering system filters the pool water. Referring to FIG. 1, the reference numeral 10 refers in general to the filtering system of the present invention which comprises a tank or container 12 which is generally cylindrically shaped, shown mounted on a generally cylindrically shaped pedestal o support base 14 which in turn is formed integral with a skid 16. Also shown secured on the skid 16 are pump 18 and motor 20. The pump 18 is driven by the motor 20 to pump water in through an inlet 22, formed on the pump housing, and out through an outlet 24, also formed on the pump housing, to the tank 12.

Pump 18 is of a size and capacity which is capable of handling relatively large solid particles of up to 5 cm in diameter. Use of a vortex or centrifugal pump is preferred, although pneumatically actuated diaphragm pumps and turbine pumps can be adapted for use in the system. The selection of suitable pumps will be apparent to one familiar with the art and is exemplified by the eguipment described in Perry's *Chemical Engineer's Handbook* (5th Ed) pp. 6-5 through 6-14, the disclosure of which is herein incorporated by reference.

The tank 12 includes a side wall 26 which preferably is cylindrically shaped, a bottom wall 28 at one end of side wall 26 and a removable cover 30 at the other end of side wall 26 and coaxially aligned therewith. The cover 30 may be secured to the body portion of the tank 12 with an O-ring (not shown) disposed therebetween for a liquid tight seal and an outer sealing ring 30a circumferentially applied about the cover 30 and tightened to provide the seal with a nut and bolt (not shown). The cover 30 may be generally dome shaped and is shown in the form of a frustum of a spherical segment, the top planar surface 31 of which comprises a material which is transparent or translucent to light, e.g., glass, polycarbonate, polyvinyl chloride, polyetherimide, or the like, so that the interior of the tank 12 can be viewed. The side wall 26 and bottom wall 28 form the body portion of the tank 12. Side wall 26 contains outlet ports 32 and 34 in its lower portion and an inlet port 36 in its upper portion. A plug 33 and O-ring (not shown) extends into and seals outlet port 34. A pressure gauge 38 having a manual air release valve 39 is shown mounted on cover 30. The pressure gauge 38 measures the pressure differential across the filter medium within tank 12.

Figure 2:
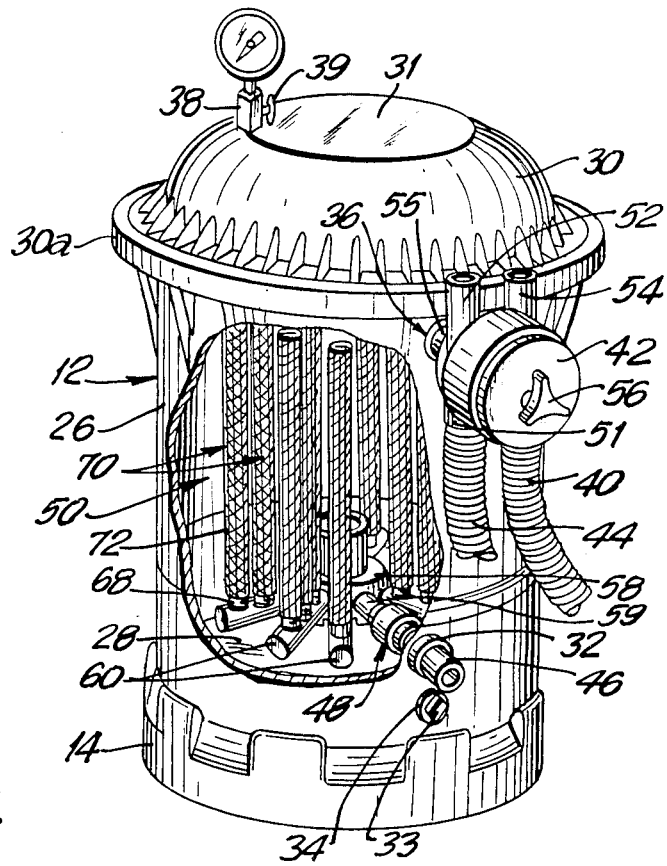
FIG. 2 is a view of the filter system shown in FIG. 1 partially broken away to show in detail a central manifold, the arms radiating therefrom, and a multiplicity of vertical filter grid units connected to the arms which are situated in the interior of the tank.
Figure 3:
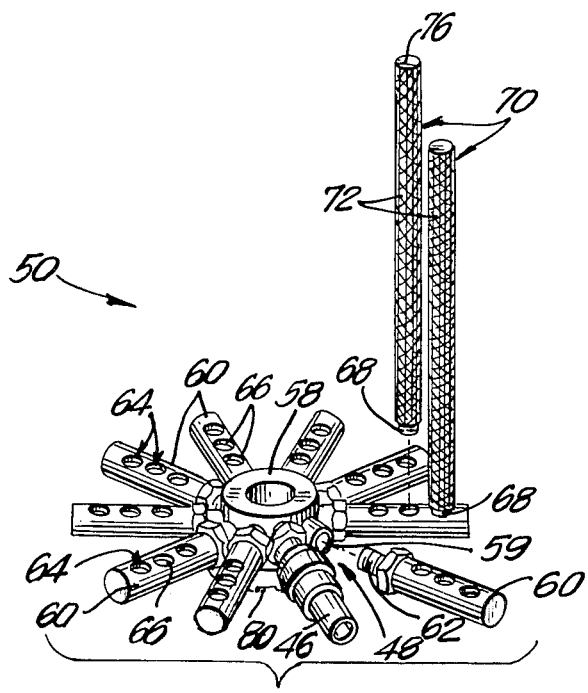
FIG. 3 is a view in elevation and perspective detail of the manifold assembly showing: a threaded end of one of the filter grid units removably coupled to a mating threaded opening in one of its radially extending arms; one of the filter grid units prior to being removably coupled to one of the arms of the manifold assembly; and one of the arms prior to being removably coupled to one of the threaded inlet ports of the manifold.
Figure 4:
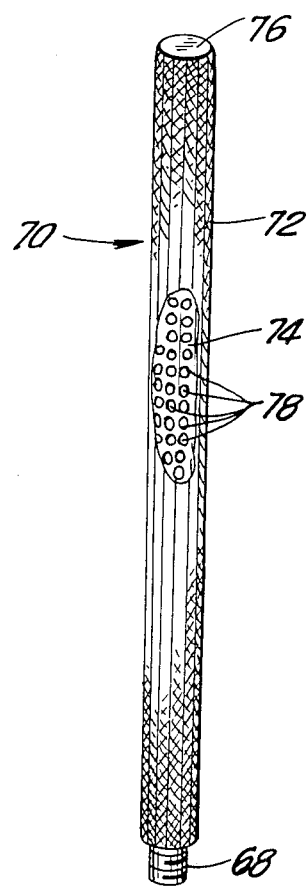
FIG. 4 is a lateral view in elevation and perspective of a filter grid unit in accordance with the invention which has been partially broken away to show the rigid, cylindrically shaped, interior perforated support frame and the outer woven or braided tubular covering for the support frame.

Flexible hoses or conduits are typically employed to transport the pool water to be filtered to and from the filtering system 10. A conduit (not shown) having one end in communication with the pool is connected at its other end to inlet 22, for example, using a hose clamp. Another conduit 40 has one end thereof connected to outlet 24 of pump 18, e.g., via a hose clamp (not shown) and is connected at its other end to an inlet port (not shown) of four-way multiport valve 42. Conduit 44 has one end thereof connected to a nipple 46 extending through outlet port 32 of tank 12, the nipple 46 forming the outer end of a hollow conduit arm 48 extending from a filter grid unit and manifold assembly 50 which is shown in FIGS. 2 and 3. The other end of conduit 44 is connected to a second inlet port 51 of valve 42.

Valve 42 has two inlet ports (one being inlet port 51 and the other not shown) and two outlet ports 52 and 54 for connection to fluid conduit line. Valve 42 has a threaded nipple end 55 which extends through inlet port 36 into tank 12. The nipple 55 forms part of the housing of valve 42 and secures valve 42 against the exterior of tank 12. The nipple 55 threads into a coupling located within tank 12 and having a threaded inlet and associated washers (not shown).

A valve handle 56 on the housing of valve 42 is rotatable into four positions for diverting the pool water: (1) filter; (2) backwash; (3) drain; and (4) waste, as more fully described hereinafter. Valve assemblies which are suitable for use as the four way multiport valve 42 in the filtering system of the present invention are known and include those described in U.S. Pat. Nos. 3,721,268 to Erlich et al.; 4,105,555 to Pease; or 4,328,833 to Aurther, the disclosures of which are incorporated herein by reference.

Centrally disposed within and located at the bottom 28 of tank 12 is filter grid unit and manifold assembly 50 which is comprised of a central manifold having a central hub 58 having a plurality of hollow arms 60 extending radially therefrom. The central hub 58 is hollow, cylindrically shaped and has a side wall with a plurality of ports therein and equally spaced apart from one another. Each of the ports has a threaded inlet or socket 59 forming part of the housing on the hub 58 and is adapted to receive a mating threaded end 62 of a hollow arm 60 (FIG. 3) or a threaded end (not shown) of outlet conduit arm 48. The arms 60 and outlet conduit arm 48 extend radially from the side wall of the central hub 58 in a plane perpendicular to the longitudinal axis of the hub 58. Each of the arms 60 has a plurality of openings 64 therein spaced apart from one another in an upper portion of the arm. Each of the openings 64 has a threaded inlet or socket 66 forming part of the housing of the hub 58 and is adapted to receive a threaded end 68 of a filter grid unit 70.

In the event that one of the filter grid units 70 or one of the arms 60 or 48 of the central hub require cleaning or replacement, each individual filter grid unit 70 or arm 60 or 48 may be separatedly uncoupled, i.e., a grid unit may be uncoupled from an arm 60 and an arm 60 may be uncoupled from the central hub and a new replacement grid unit 70 coupled to an arm 60 or an arm 48 coupled to central hub 58 (via threaded ends), to effect a guick and simple change of some or all of the components of the filter grid unit and manifold assembly 50.

Each of the filter grid units 70 comprises a sock like pervious filter tube 72 fitted over a perforated, tubular frame 74. The outer filter tube 72 is braided or woven of long flexible fibers of suitable material such as Dacron polyester, glass, polyimide, polytetrafluoroethylene, polyvinyl chloride, stainless steel, or the like. The threaded end 68 of filter grid unit 70 is open and the other end 76 is closed. In the embodiment shown, the strands are bonded together at the closed end 76 by means of heat sealing. The material of which the tube 72 is formed may be either yarnlike or monofilament. The surface of each tube 72 provides a fine mesh outer layer sufficiently fine to receive and hold a layer of diatomaceous earth particles.

The filter tube 72 may be formed of interlaced or braided, non elastic but flexible thin rod or wire-like strands of material that are chemically inert to the liquids to be filtered and to the DAE particles. While the construction of the filter tube 72 may be varied, in one embodiment, the filter tube 72 comprises strands woven with a "basket" weave in which a plurality of groups of strands, each group including a plurality of strands of small diameter, for example, 0.008 inch, are braided with the strands running helically of the tube wall and with the groups of strands braided in a "plain" or "over two - under two" weave, which is frequently used in making tubular braided structures. For convenience in manufacture, the strands may be braided on known machines so that the angle of the strands of each group of strands with the diametral plane of the tube 72 is about 45° so as to balance the end and side wall pressures and produce a stable construction which will neither swell nor elongate under pressure.

The outer tube 72 is supported by a rigid, perforated tubular support frame 74 preferably formed of a moldable synthetic plastic material such as polyethylene, polypropylene, polysulfone, polycarbonate, acrylonitrile-butadiene-styrene (ABS) or acrylonitrile-chlorinated polyethylene-styrene (ACS), acrylic-styrene-acrylonitrile (ASA) polymers, and the like. Suitable moldable plastic materials also are believed to include fluoroplastics (e.g., polytetrafluoroethylene), phenylene ether copolymers, polyamide-imide, polybutyleneterephthalate, polyetheretherketone, an acetal homopolymer, polyoxymethylene (commercially available from E. I. duPont de Nemours & Co., Washington, Del. 19898, under the trade name Delrin), acetal copolymers (commercially available from Celanese Engineering Resins, 86 Morris Ave., Summit, N.J. 07901, under the trade name Celcon) and epoxy-glass resins and the like.

The support frame 74 has a plurality of openings 78 therein extending through its walls in spaced apart relation longitudinally and circumferentially thereof. The openings 78 are sufficiently large to permit passage of pool water through the frame 74 without build-up of pressure in the tank 12 but not sufficiently large to provide the support frame 74 with inherent resiliency along its longitudinal axis. The support frame 74 is dimensioned to nest snugly within outer tube 72 in a non-sliding, tight-fitting relationship.

The outlet conduit arm 48 comprises a unitary member or one or more elements which may be coupled together with suitable sealing means such as rubber washers to form a unitary member. Referring now to FIGS. 2 and 3, the outlet conduit arm 48 comprises a series of threaded elements which are coupled together to form a unitary assembly. One end of the outlet conduit arm 48 is threaded into inlet port 59 within the side wall of central hub 58. The other end which is not threaded extends through outlet port 32 of tank 12 for connection to one end of a conduit 44, shown as a flexible hose in FIG. 1. When it is desired to remove filter unit and manifold assembly 50 from tank 12, conduit arm 48 is decoupled from the hub 58, the cover 30 is removed and the assembly 50 may then be lifted from the tank 12.

The base of the central hub 58 rests within the interior of tank 12 on the bottom wall 28 thereof. An annular groove or depression 80 extends diametrically across the circular cross-section of the base of the central hub 58 to permit release of air which may become trapped under the base during placement of the assembly 50 within a tank 12 filled with water.

The filter grid units 70 preferably are cylindrically shaped but it is believed that polygons, e.g., an octagon or decagon also would be suitable shapes.

In operation, the valve 42 is rotated into the filter position permitting water from the pump 18 to pass through inlet 22, outlet 24, conduit 40, inlet 36 and nipple 55 into the tank 12 and then through the plurality of filter grid units 70, into arms 60 and out of exit port 32 of tank 12 through conduit arm 48, and through conduit 44, inlet port 51 and outlet port 52 of valve 42.

Initially, a slurry of DAE particles and pool water is introduced into the tank 12 to be deposited uniformly over the surfaces of the filter grid units 70. This precoats the surfaces of the filter tubes 72 with a layer of DAE particles. Typically, a minimum quantity of about 1 pound of DAE per 9 filter grid units 70 (typically having a diameter of about ¾ inch and a length of 11 inches) is fed into the tank 12. DAE, also known as diatomite, diatomaceous, silica, kieselguhr and infusorial earth is composed predominantly of the skeletal remains of microscopic single celled aquatic plants called diatoms. Physically, the diatom skeleton is an intricate structure having many submicron pores that occur, like snowflakes, in a large variety of shapes, no two being the same. DAE particles are typically sized between 10 to 200 micrometers (microns) in diameter and although they are as fine as cake flour in appearance, they have intricate and varied shapes. These irregular characteristics allow a free passage of water through a layer of DAE particles but filter out contaminants sized greater than about 1 micron.

After the DAE particles have coated the vertical filter grid units 70, a precoat pressure is read using the pressure gauge 38. The filtering cycle begins as soon as the filter grid units 70 have been precoated. As the layer of DAE particles separates contaminants from the pool water, the accumulation of contaminants, typically particulate and oily matter, progressively blocks water passage through the filtering DAE particles and ultimately requires regeneration thereof. Upon sufficient accumulation of such contaminants, the pressure within the tank 12 may increase to the limit of the pump 18 used to force water through the filter grid units 70. As a result, the flow of water through the filter grid units 70 diminishes. The extent of contaminant accumulations may be readily measured by gauging the pressure drop across the filter grid units 70 with pressure gauge 38. The pressure drop at a given point signals that the filter grid units 70 are not functioning effectively or that the pump 18 being used to move the pool water is insufficient to effect movement against the pressure drop experienced against the filtering grid units 70 and in the tank 12. Typically, for a ¾ Horsepower pump capable of running at 3450 RPM, when the pressure drop rises 7-10 psi above the pre-coat pressure, it is preferred to regenerate the filter grid units 70.

For regeneration, the pump 18 is stopped and the valve 42 is turned to the "backwash" position. The flow of water, described previously in connection with the filter cycle, is reversed. Water from pump 18 is permitted to pass through inlet 22, outlet 24, conduit 40, inlet port 51, conduit 44, exit port 32, conduit arm 48, arms 60 and through filter grid units 70 into tank 12 and then cut of tank 12 through inlet port 36 to exit port 54 of valve 42.

In the backwash cycle, the pool water is directed in such a manner that accumulated contaminants coating the DAE layer are flushed free of the vertical filter grid units 70. The flushed contaminants and DAE particles are directed to a waste line (not shown), which is coupled to exit port 54 of valve 42, for disposal beyond the pool. After thus "backwashing" the vertical filter grid units 70, the valve 42 is turned back to the "filter" position and fresh DAE particles are added to the tank to precoat the filter grid units 70.

It has been found that the filtering cycle can be prolonged, without reguiring a "bumping" of the filter grid units 70 or a backwash and regeneration of the DAE particles, by using the vertical filter grid units 70 of this invention. During the filtering cycle, the DAE particles in the pre-coat layer on the filter grid units 70 accumulate and trap a layer of contaminants on their outer surfaces, i.e., the surfaces that face the water to be filtered (the "upstream" surfaces). Each time the pump is stopped during a filtering cycle, the DAE particles fall to the base 28 of the tank 12 due to gravity and their interconnection in the pre coating layer. Each time the pump is restarted, the DAE particles within the tank reform a pre coating layer on the outer surface of the filter grid units 70 In so doing, the DAE particles are believed to reorient themselves in different spatial locations vis-a-vis the other DAE particles within the pre coating layer. The reorientation of the DAE particles means that the make-up of their upstream surfaces is not the same as the make-up of the pre-coating layer during the previous segment of the filtering cycle. Fresh surface areas of the DAE particles which have not previously comprised the upstream surface of the pre-coating layer now comprise such upstream surfaces. This regenerates the filter grid units 70 during the filtering cycle and extends the useful life of the DAE particles before a backwashing step is required.

The "waste" position of valve 42 is used for bypassing the filtering apparatus. Water will be pumped from the pool and go directly from the pump 18 through inlet 22, outlet 24, conduit 40 to the exit.port 54 of valve 42. This permits power vacuuming of a very dirty pool or one that has been flocced so that the collected water can be discharged. It is further sometimes desired by pool owners to rinse the waste line until residual contamination therein has been flushed out, or, to have a forceful, albeit unfiltered, flow of water for therapy pools, or spas.

The "drain" position of the valve 42 also by-passes the filtering apparatus of this invention. The motor 20 may be shut off and pool water will flow by gravity from the pool through inlet 22, outlet 24, conduit 40 and will discharge from outlet 54. In the drain position, the pool level will be lowered up to the skimmer (the level where the other end of the fluid conduit line coupled to the inlet of the pump is situated).

It is understood that the system of the present invention is not limited to use with swimming pools but is equally applicable to other environments reguiring a similar type filtering action.

The specific embodiments described above are intended to be representative and illustrative of the filtering system of the present invention which can be modified without departing from the spirit and scope of the invention which is to be determined by the following claims.

What is claimed is:

1. A filtering system by which fluid containing particulate matter suspended therein may be clarified by separating the particulate matter from the fluid, the filtering system comprising:
    a vessel having a base, a side wall, an open upper end, an inlet port in an upper end of the side wall of said vessel for receiving said fluid to be filtered, and an outlet port in a lower end of the side wall of said vessel for discharging filtered fluid;
    a filter grid unit and manifold assembly removably positioned on the base of said vessel and comprising a central manifold having a hollow hub and a plurality of hollow support arms and a hollow conduit arm extending radially from, and symmetrically about, said hub in a plane perpendicular to the longitudinal axis of said manifold, said conduit arm being open at both ends and said support arms being open at one end, an open end of said conduit arm and the open end of each of said support arms being removably connected to said hub, each of said support arms having a plurality of filter grid units having threaded ends removably connected to a plurality of threaded openings in said support arms which are spaced apart from one another in an upper portion of said support arms and align said filter grid units vertically within said vessel and spaced apart from one another;
    each of said filter grid units comprised of a perforated tubular support frame open at both ends and having a rigid non-flexible side wall, the perforations being large enough to pass unfiltered fluid therethrough, and a flexible outer sleeve encasing said tubular support frame, said outer sleeve formed of a synthetic plastic fiber braided or woven into a tubular shape and having a multiplicity of interstices therein which pass fluid therethrough but are small enough to prevent diatomaceous earth particles from passing through, said outer sleeve being tightly wrapped over, and sealed at both ends to said inner support frame providing a rigid unitary structure therewith, said outer sleeve being open at one end and adapted at said open end to thread into an opening in one of said support arms, and said outer sleeve being closed at its other end;

means communicating said vessel outlet with the open end of said conduit arm of said central manifold which is not connected to said hub;

pump means and associated conduit lines for causing fluid to flow into and out of said vessel and to first and second outlet lines;

valve means and associated conduit lines for controlling flow of fluid into and out of said vessel and through said filter grid unit and manifold assembly into said first or second outlet lines and for controlling flow of fluid, by-passing said vessel, into said first or said second outlet line; and means separate from said vessel and said filter grid unit and manifold assembly for providing a seal-tight cover for the upper end of said vessel.

2. The filtering system of claim 1 wherein the tubular support frame is comprised of a moldable plastic material selected from the group consisting of polyethylene, polypropylene, polysulfone, polycarbonate, acrylonitrile-butadiene-styrene, and the outer filter tube is comprised of a material selected from the group consisting of a polyester, glass, polyimide, polytetrafluoroethylene, polyvinyl chloride and stainless steel.

3. The filtering system of claim 2 wherein the tubular support frame is comprised of acrylonitrile-butadiene-styrene or polypropylene and the outer filter tube is comprised of a polyester.

4. The filtering system of claim 1 wherein said filter grid units are cylindrically shaped.

5. The filtration system of claim 1 wherein said filter grid units are sufficiently strong to withstand a pressure differential of about 100 psi.

6. A filtering system comprising:

a tank having a removable cover and an inlet port for receiving liquid to be filtered and an outlet port for discharging liquid filtrate;

a central manifold disposed in said tank, having an outlet means in communication with said tank outlet port and in communication with a plurality of filter grid units, said manifold including means for supporting the filter grid units relative to one another comprising a central hub having a cylindrical side wall, a plurality of support arms which are removably connected to and extend radially from the side wall of the central hub in a plane perpendicular to the longitudinal axis of the central hub, each of the support arms having a plurality of threaded openings therein which are spaced apart from one another and adapted to receive respective threaded ends of said filter grid units in said tank and vertically align said filter grid units;

said filter grid units disposed in said tank in the path of said liquid being rigid and stationary, each of said filter grid units comprising a perforated support frame, and a permeable filter tube, said tube being in the form of a braided, essentially non extensible tubular member encasing and sealed to said support frame, and in registry therewith, said tubular member being closed at one end and open at its other end, said open end of said filter grid being threaded and removably connected to a threaded opening in one of said support arms; the interstices of said braided filter tube capable of passing liquid but not passing diatomaceous earth particles;

pump means in fluid communication with said inlet and outlet ports in said tank for circulating liquid into and out of said tank through said filter grid units and said central manifold and also in fluid communication with a waste line for passage externally of said system by-passing said tank; and valve means disposed between said pump means and said tank for controlling flow of said liquid into and out of said tank and through said filter grid units and central manifold and for controlling flow of said liquid by-passing said tank.

7. The filtering system of claim 6 wherein said outlet means of said central manifold comprises a conduit arm open at both ends and having a threaded end which is removably connected to a threaded opening in said side wall of said central hub and extends radially therefrom in a plane perpendicular to the longitudinal axis of said central hub, the other end of said conduit arm extending through said tank outlet port externally of said tank.

8. A filtration system for filtering a swimming pool liquid containing particulate contaminants which comprises:

a. a tank having a fixed body and a removable cover, said body having an inlet port in its upper end and an outlet port in its lower end, b. a removable filter assembly disposed within said tank, said filter assembly comprised of a manifold assembly and a plurality of like, vertically disposed, filter grid units of cylindrical shape, said manifold assembly including a cylindrical hub having a plurality of detachably connected, radial support arms and a conduit arm extending therefrom in a plane perpendicular to the longitudinal axis of the hub, said conduit arm being in fluid communication with said outlet port in said body, said support arms having openings uniformly disposed in upper surfaces thereof adapted to be detachably connected to ends of said filter grid units, each of said filter grid units having a rigid, non bendable and perforated plastic tubular inner sleeve enclosed within a fine mesh plastic tubular, outer sleeve capable of passing water and retaining diatomaceous earth particles in its interstices, the perforations being uniformly spaced circumferentially and longitudinally about said inner sleeve, said inner sleeve being coaxial with said outer sleeve and fixedly disposed relative thereto and forming said unitary grid unit therewith, said filter grid units having imperforate tops and bottom connecting means which are adapted to threadably connect said units with said openings in said support arms, said filter unit and manifold assembly being disposed in a flow path of a liquid passing into and out of said tank;

c. a pump means in fluid communication with an inlet line for the liquid to be filtered, with said inlet and outlet ports in said tank, and with return and waste lines, said pump means being capable of causing said liquid to flow into and out of said inlet and outlet ports, through said filter unit and manifold assembly and out through said return or waste lines and further being capable of causing said liquid to by-pass said tank and flow out of said return or waste lines; and d. a multifunctional valve means in fluid communication with said pump means, with said ports in said tank, and with said return and waste lines and having:

a first control means having open and closed states and capable of controlling the flow of said liquid into said inlet port through said filter unit and manifold assembly and said outlet port, and out through said return line;

a second control means having open and closed states and capable of controlling the flow of said liquid into said outlet port, through said filter unit and manifold assembly and said inlet port, and out through said waste line;

a third control means having open and closed states and capable of controlling the flow of said liquid by-passing said tank out of said return line; and a fourth control means having open and closed states and capable of controlling the flow of said liquid by-passing said tank out of said waste line; and means for moving each of said first, second, third and fourth control means between their respective open and closed states.

* * * * *